United States Patent [19]

Segawa et al.

[11] 3,922,186
[45] Nov. 25, 1975

[54] METHOD FOR LINING SURFACES WITH SHEETS OF POLYVINYLIDENE FLUORIDE

[75] Inventors: Masahiro Segawa; Yukichika Kawakami; Mitsuru Itoh, all of Iwaki, Japan

[73] Assignee: Kureha Kagaku Kogyo K.K., Tokyo, Japan

[22] Filed: Oct. 12, 1972

[21] Appl. No.: 296,930

[30] Foreign Application Priority Data
Oct. 20, 1971  Japan.............................. 46-82416

[52] U.S. Cl. ................ 156/310; 156/244; 156/290; 428/193; 428/228; 428/268; 428/269; 428/285; 428/286; 428/343; 428/354; 428/421
[51] Int. Cl.²............................................ B32B 7/00
[58] Field of Search ......... 161/93, 94, 95, 189, 204, 161/DIG. 4, 156; 156/272, 306, 307, 246, 324, 310, 244, 290, 193; 117/126 GB, 161 VZ; 428/228, 238, 265, 268, 269, 285, 286, 343, 354, 44

[56] References Cited
UNITED STATES PATENTS

| | | | |
|---|---|---|---|
| 2,774,704 | 12/1956 | Smith.................................. | 161/189 |
| 2,809,130 | 10/1957 | Rappaport.......................... | 161/189 |
| 2,941,912 | 6/1960 | Cox et al. ........................... | 161/189 |
| 3,069,305 | 12/1962 | Fahrbach et al.................... | 161/156 |
| 3,378,433 | 4/1968 | Palazzolo et al................... | 161/156 |
| 3,380,879 | 4/1968 | Schonhorn et al................. | 161/189 |
| 3,475,248 | 10/1969 | Brasure.............................. | 161/189 |
| 3,779,854 | 12/1973 | Dukert et al....................... | 161/189 |

*Primary Examiner*—William J. Van Balen
*Assistant Examiner*—James J. Bell
*Attorney, Agent, or Firm*—Lane, Aitken, Dunner & Ziems

[57] ABSTRACT

A method is disclosed for protecting a surface from corrosion that involves bonding, by means of an adhesive, a glass cloth surface of a laminate to the surface to be protected. The exposed surface of the laminate is a polyvinylidene fluoride having a $\eta$inh of 0.7 to 1.5.

6 Claims, 2 Drawing Figures

METHOD FOR LINING SURFACES WITH SHEETS OF POLYVINYLIDENE FLUORIDE

BACKGROUND OF THE INVENTION

Polyvinylidene fluoride sheets have been used in the past to protect the metal surfaces of various vessels and apparatus used in the chemical industry. Polyvinylidene fluoride is highly resistant to the effects of chemicals, weather and heat.

In the past, the formation of corrosion resistant protective layers of polyvinylidene fluoride resin has generally been accomplished by either the "molten coating" method or by the "sheet-lining" method. The "molten coating" method requires a heating furnace and is impractical to use in many applications. The sheet-lining method involves the use of adhesives or rivets. In the method using rivets, there results a large difference in the thermal expansion between the polyvinylidene fluoride and the metal sheet to be lined, so that the polyvinylidene fluoride gradually becomes deformed due to strains imposed thereon by temperature changes and the lining rises off the tank wall.

Moreover, no adhesive has been found which will firmly adhere to polyvinylidene fluoride resin and have suitable heat resistance and durability. Accordingly, where an adhesive is employed, over a long period of time the sheet lining tends to separate when subjected to conditions involving large temperature changes.

SUMMARY OF THE INVENTION

It has now been discovered that the above-indicated problems can be substantially overcome by a method involving the steps of laminating a glass cloth to one surface of a sheet of polyvinylidene fluoride resin having an inherent viscosity within a critical range to form a composite having portions of the above resin sheets and the glass cloth embedded in each other; bonding the glass cloth surface of the resultant composite sheet to the surface to be protected by means of an adhesive. An edge or edges of the polyvinylidene fluoride sheet may then be welded to the adjacent side edges of a composite sheet or sheets by the use of a welding bar composed of a polyvinylidene fluoride resin having an inherent viscosity index within the critical range.

Accordingly, it is an object of the present invention to provide an easily applied method of forming a corrosion resistant protective layer of polyvinylidene fluoride resin on surfaces of materials used for fabricating various instruments and apparatuses used in the chemical industry.

It is another object of the present invention to provide such a method that gives a bond between the polyvinylidene fluoride sheets that will resist severe temperature changes.

These and other objects of the present invention will become apparent to one skilled in the art from a reading of the description to follow taken in conjunction with the drawings and appended claims.

DETAILED DESCRIPTION OF THE PREFERRED EMBODIMENTS

Figure 1:
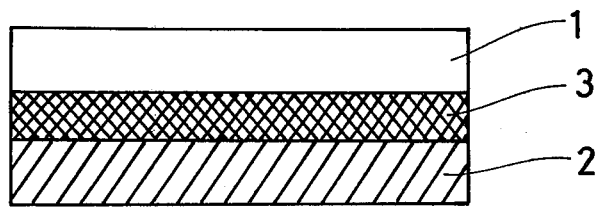
FIG. 1 is a vertical sectional view of a composite sheet used in the present invention.

FIG. 1 shows a composite sheet of laminate composed of a polyvinylidene fluoride layer 1, and a glass cloth 2, and an intermediate portion 3 in which the cloth sheet is embedded in the polyvinylidene fluoride to insure firm adhesion. The composite sheet has the glass cloth on one surface so that an adhesive, used in accordance with the present invention, i.e. an epoxy resin, polyester resin, phenolic resin, rubber-based resin or the like, may be applied to the glass cloth to furnish a firm bond when applied to the surface to be protected.

The above-described composite or laminate sheet may easily be prepared by extruding a polyvinylidene fluoride resin having a $\eta$inh of 0.7 to 1.5, to form a sheet having a thickness of about 1 mm, then immediately superimposing a plain weave glass cloth having a thickness of about 0.25 mm upon the resin sheet while the resin sheet is still in a fluid or semi-fluid state, and bonding the superimposed sheets to each other by passing the same between pinch rolls. The inherent viscosity index "$\eta$inh", as used herein, is calculated from the following formula, on the basis of a solution viscosity $\eta r$ which is determined by measuring at 30°C the viscosity of 0.4 g of a polyvinylidene fluoride in 100 cc of dimethylformamide.

$\eta\text{inh} = [\ln \eta r]/C \quad (C = 0.4)$

The degree of polymerization of a polymer is generally expressed as a function of the resin viscosity (a solution viscosity or an intrinsic viscosity), while the degree of polymerization of polyvinylidene fluoride is frequently indicated by way of its inherent viscosity per se, thus the above $\eta$inh being adopted.

Figure 2:
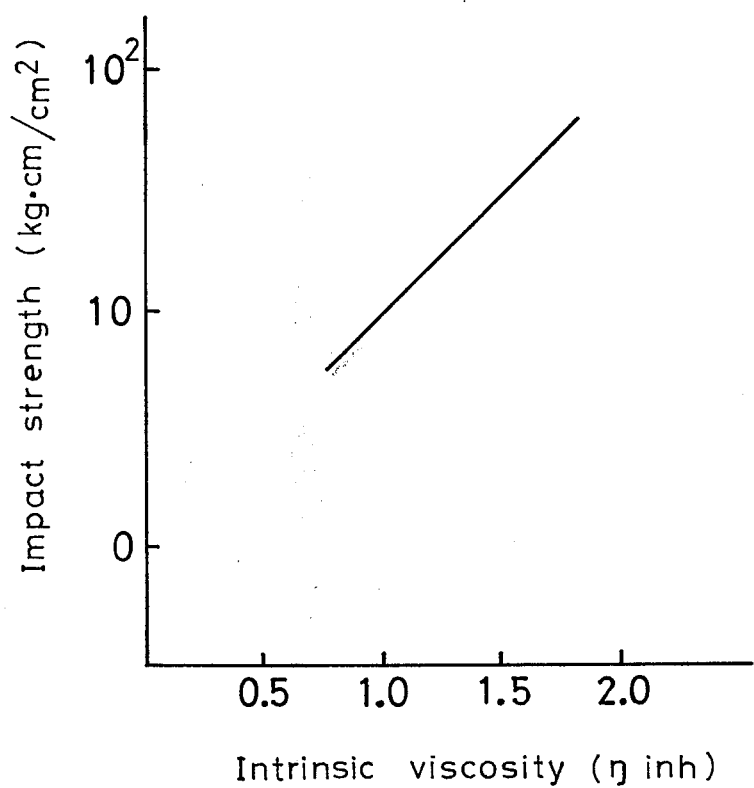
FIG. 2 is a graph showing (measured by V-notched Izod) the relationship between the inherent viscosity and impact strength of a polyvinylidene fluoride prepared by a suspension polymerization method.

The $\eta$inh of the polyvinylidene fluoride used for the formation of the composite sheet in accordance with this invention is preferred to be within the range of 0.7 to 1.5. If the $\eta$inh exceeds 1.5, it is difficult to weld the composite sheets to each other, so that even if the welded joint appears secure, cracks tend to develop at the welded joint after cooling. If the $\eta$inh is less than 0.7, the resin flows easily during welding, but the impact strength of the resin is lower as shown in FIG. 2.

In the process of the present invention, the composite sheet is adhesively bonded to a substrate material and then another composite sheet is bonded to the substrate in such a manner that the adjacent side edges of the two composite sheets are in contact with each other. When lining an inner or outer surface of a cylindrical object, the meeting ends of a single composite sheet can be bonded to each other. Thus, when the surface to be lined has been covered with a number of composite sheets, the adjoining edges of adjacent composite sheets are welded to each other. Alternately, the edges may be welded before the adhesive bonding.

Excess adhesive is often forced out onto the outer polyvinylidene fluoride surface from the joints of the side edges. In such cases, the excess adhesive is cut away and the polyvinylidene fluoride layers at the sheet joints are then welded together using a polyvinylidene fluoride welding bar.

It is preferred that the welding bar used in the present invention be composed of a polyvinylidene fluoride having a $\eta$inh of 0.7 to 1.3. Where the $\eta$inh of the resin exceeds 1.3, the fluidity of the resin is too low to provide a satisfactory weld. On the other hand, where the $\eta$inh of the resin is less than 0.7, the strength of the welded portion is unsatisfactory.

Additives such as pigments, fillers and the like may be admixed with the polyvinylidene fluoride resin used in forming the composite sheet. If, however, an excessive amount of fillers is added to the resin, the mechanical strength of the mixture is decreased; accordingly, the amount of the filler is preferred to be less than 40% by weight. The welding bar may also include a small amount of additives, but the additives should be in an amount less than 10% by weight.

The welding may be carried out by a method similar to that used with conventional polypropylene, e.g. the welding is conducted by contacting the welding bar with the edge portions to be welded and by applying hot air to the point of contact at a temperature of 200° to 400°C and at a guage pressure of 0.2 to 1 kg/cm² (preferably 0.4 to 0.8 kg/cm²).

According to the present invention, since the lining operation consists only of the steps of adhesion and hot air welding, the lining of any large-size tank can be very easily conducted in the field as it requires no special equipment such as a furnace. Furthermore, the adhered surface of the composite sheet is glass cloth, so that a conventional technique such as FRP lining can be used to provide a firmly adhered lining.

The present invention is illustrated in greater detail by the following examples.

EXAMPLE 1

Different types of polyvinylidene fluorides, having differing $\eta$inh of 0.8, 1.0, 1.2, 1.4, 1.6 and 1.8, respectively, were extruded into sheets 1 mm thick. Immediately after extrusion, each of the still hot sheets was laid over a 0.25 mm thick flat weave glass cloth (30 threads per 2.5 cm). The superimposed sheets were then pressed together by passing same through pinch rolls to form a composite sheet as shown in FIG. 1. Each of the composite sheets was then cut into two specimens of 1 cm × 5 cm. The polyvinylidene fluoride layer at the shorter side of each composite sheet was cut away obliquely at an angle of 45°. The obliquely-cut sides of like sheets were joined and welded using a welding bar having a diameter of 3 mm. The welding in all cases was conducted with a welding gas temperature of 270°C and a gauge pressure of 0.5 kg/cm². After cooling each welded sheet, the welded portions were planed so that the welded portions were reduced to the same level as the sheet surfaces. The welded sheets were then each bent (folded) with the polyvinylidene fluoride layer facing outward. The sheets obtained from polyvinylidene fluorides having $\eta$inh of 1.6 and 1.8 separated at the welds when bent beyond 45°. The sheet of resin having a $\eta$inh of 1.4 showed cracks when bent past 90°. No damage was observed at the welds when sheets of polyvinylidene fluorides, having $\eta$inh less than 1.2, were bent nearly 180°.

EXAMPLE 2

A series of experiments were conducted similar to those of Example 1 except that the polyvinylidene fluoride resin used for each composite sheet had a predetermined $\eta$inh value (1.0) and that a variety of polyvinylidene fluorides were used as the welding bar. With welding bars of polyvinylidene fluoride having a $\eta$inh of 1.4 to 1.8, the welded joints readily separated when bent at an angle beyond 45°. In contrast, the joints welded with polyvinylidene fluoride resins having a $\eta$inh of 1.2 to 0.8 did not show any change when bent nearly 180°.

The invention may be embodied in other specific forms without departing form its spirit or essential characteristics. The present embodiments are, therefore, to be considered in all respects as illustrative and not restrictive, the scope of the invention being indicated by the claims rather than by the foregoing description, and all changes which come within the meaning and range of the equivalents of the claims are therefore intended to be embraced therein.

What is claimed is:

1. A method for protecting a surface from corrosion comprising:
    providing a laminated sheet or sheets, said sheet or sheets comprising a glass cloth and polyvinylidene fluroide sheet having an $\eta$inh of 0.7–1.5, said glass cloth being partially embedded in said polyvinylidene fluoride so as to leave one surface of said glass cloth exposed,
    adhesively bonding said exposed surface of said glass cloth to the surface to be protected, said adhesive being applied to said exposed surface; and
    hot-gas welding adjoining edges of said sheet or sheets using a welding bar of polyvinylidene fluoride having a $\eta$inh of 0.7 to 1.3.

2. The method of claim 1 wherein said hot-gas welding is effected by applying hot air to said adjoining edges at a temperature of 200° to 400°C and at a guage pressure of 0.2 to 1 kg/cm².

3. The method as set forth in claim 1 wherein said laminated sheet is formed by a method comprising:
    forming a polyvinylidene fluoride resin having a inh of 0.7 to 1.3 into a plastic sheet;
    superimposing said plastic sheet on a glass cloth while said plastic sheet is still partially molten to form a composite; and
    compressing said composite to form a laminate.

4. The method of claim 1 wherein said polyvinylidene fluoride has a thickness of about 1 mm.

5. The method of claim 1 wherein said glass cloth has a thickness of about 0.25 mm.

6. The method of claim 1 wherein said adhesive is a member from the group consisting of epoxy resins, polyester resins, phenolic resins, and rubber-based resins.

* * * * *

UNITED STATES PATENT OFFICE
CERTIFICATE OF CORRECTION

Patent No. 3,922,186     Dated November 25, 1975

Inventor(s) Masahiro Segawa, Yukichika Kawakami & Mitsuru Itoh

It is certified that error appears in the above-identified patent and that said Letters Patent are hereby corrected as shown below:

Column 1, line 17, sheet-lining should read --"sheet-lining"--.

Column 3, line 17, "guage" should read --gauge--.

IN THE CLAIMS:

Claim 2, line 3, "guage" should read --gauge--.

Claim 3, line 3, "inh" should read --ηinh--.

Signed and Sealed this thirtieth Day of March 1976

[SEAL]

Attest:

RUTH C. MASON
*Attesting Officer*

C. MARSHALL DANN
*Commissioner of Patents and Trademarks*